United States Patent
Kimura

(10) Patent No.: US 7,994,247 B2
(45) Date of Patent: Aug. 9, 2011

(54) POLYESTER COMPOSITIONS

(75) Inventor: Kenji Kimura, Funabashi (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 0 days.

(21) Appl. No.: 12/490,687

(22) Filed: Jun. 24, 2009

(65) Prior Publication Data
US 2009/0326115 A1 Dec. 31, 2009

(30) Foreign Application Priority Data
Jun. 26, 2008 (JP) ................. 2008-166769

(51) Int. Cl.
*C08K 5/523* (2006.01)
(52) U.S. Cl. ........................................ 524/117
(58) Field of Classification Search ........... 524/117
See application file for complete search history.

(56) References Cited

U.S. PATENT DOCUMENTS

| | | | | |
|---|---|---|---|---|
| 4,196,117 A | * | 4/1980 | Spivack | 524/119 |
| 5,874,494 A | * | 2/1999 | Inui et al. | 524/117 |
| 5,889,095 A | * | 3/1999 | Inui et al. | 524/117 |
| 5,891,939 A | * | 4/1999 | Kikuchi et al. | 524/117 |
| 7,732,518 B2 | * | 6/2010 | Awa et al. | 524/394 |
| 2007/0100045 A1 | * | 5/2007 | Kimura et al. | 524/291 |
| 2007/0129280 A1 | * | 6/2007 | Kimura | 510/446 |

FOREIGN PATENT DOCUMENTS

| | | |
|---|---|---|
| EP | 0 002 821 A1 | 7/1979 |
| EP | 1985652 A2 | 10/2008 |
| GB | 2311528 A | 10/1997 |
| JP | 6-329887 A | 11/1994 |
| JP | 2002-138188 A | 5/2002 |

* cited by examiner

*Primary Examiner* — Peter Szekely
(74) *Attorney, Agent, or Firm* — Sughrue Mion, PLLC

(57) ABSTRACT

A polyester composition containing (A) a polyester, (B) a phosphite of the formula (I):

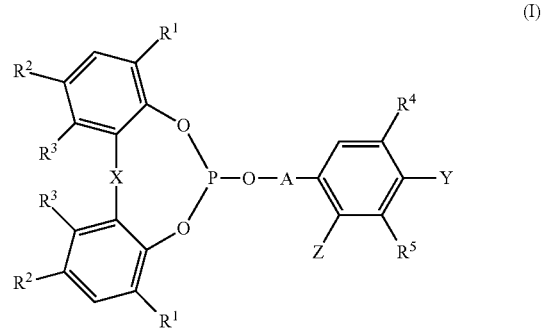

and (C) a neutralizing agent and/or a compound of the formula (II):

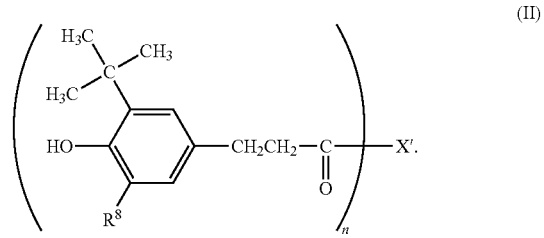

5 Claims, No Drawings

POLYESTER COMPOSITIONS

FIELD OF THE INVENTION

The present invention relates to a polyester composition having good processing stability.

BACKGROUND ART

Polyester molded articles made of polyesters are widely used as casings for electronic components such as relays and connectors, films, etc. in general, the polyester molded articles are manufactured by molding polyesters in a molten state by heating.

However, polyesters may sometimes thermally deteriorated under a high temperature environment. The melt flow rate (MFR) of polyesters which are processed and molded after storage under a high temperature environment tend to increase, and thus, the processing stability of the polyesters are found to be insufficient.

To overcome this problem, JP-A-6-329887 and JP-A-2002-138188 propose a polyester composition comprising a polyester and a phosphate, which composition has superior processing stability even after storage under a high temperature environment.

SUMMARY OF THE INVENTION

However, the polyester composition proposed by the above Japanese patent applications may not always have sufficient processing stability after storage under an atmosphere of high temperature and high humidity. Thus, it is required to provide a polyester composition which has sufficient processing stability even after storage under an atmosphere of high temperature and high humidity.

According, the present invention provides a polyester composition comprising:

(A) a polyester, (B) a phosphite of the formula (I):

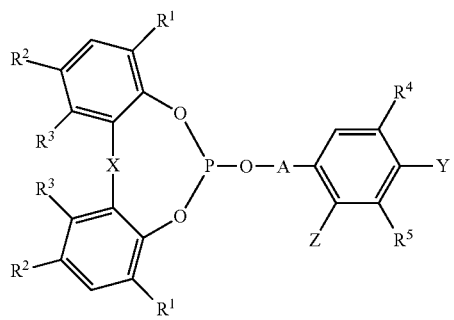

wherein $R^1$, $R^2$, $R^4$ and $R^5$ represent independently of one another a hydrogen atom, an alkyl group having 1 to 8 carbon atoms, a cycloalkyl group having 5 to 8 carbon atoms, an alkylcycloalkyl group having 6 to 12 carbon atoms, an aralkyl group having 7 to 12 carbon atoms or a phenyl group;

$R^3$ represent independently of one another a hydrogen atom or an alkyl group having 1 to 8 carbon atoms;

X represents a single bond, a sulfur atom or a divalent group of the formula (T-1):

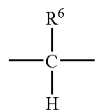

(I-1)

in which $R^6$ represents a hydrogen atom, an alkyl group having 1 to 8 carbon atoms or a cycloalkyl group having 5 to 8 carbon atoms;

A represents an alkylene group having 2 to 8 carbon atoms or a divalent group of the formula (I-2):

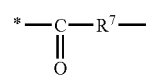

(I-2)

in which $R^7$ represents a single bond or an alkylene group having 1 to 8 carbon atoms; and * means bonding to the side of an oxygen atom); and either one of Y and Z represents a hydroxyl group, an alkyl group having 1 to 8 carbon atoms, an alkoxyl group having 1 to 8 carbon atoms or an aralkyloxy group having 7 to 12 carbon atoms, while the other of Y and Z represents a hydrogen atom or an alkyl group having 1 to 8 carbon atoms, and (C) at least one component selected from the group consisting of a neutralizing agent and a compound of the formula (II) and:

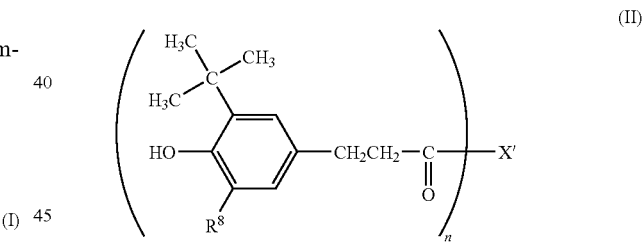

(II)

wherein $R^8$ represents an alkyl group having 1 to 8 carbon atoms; n is an integer of 1 to 4; and X' represents a n-hydric alcohol moiety having 1 to 18 carbon atoms which may have a hetero atom and/or a cyclic structure therein.

In one embodiment of the present invention, the content of the phosphite of the formula (I) is from 0.005 to 3 parts by weight per 100 parts by weight of the polyester.

In another embodiment of the present invention the total content of the compound of the formula (II) and the neutralizing agent is from 0.005 to 3 parts by weight per 100 parts by weight of the polyester.

In a further embodiment of the present invention, the component (C) contains both of the compound of the formula (II) and the neutralizing agent.

In a yet further embodiment of the present invention, the weight ratio of the phosphite of the formula (I) to the compound of the formula (II) is from 1:0.1 to 1:10.

In a still further embodiment of the present invention, the polyester is a polylactic acid.

DETAILED DESCRIPTION OF THE INVENTION

Hereinafter, the respective components contained in the polyester composition of the present invention will be described.

Firstly, the polyester as the component (A) is a polymer having a group of the formula (III) in its backbone chain:

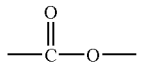
(III)

The polyester used according to the present invention may be a polyester prepared by condensation polymerization of a dicarboxylic acid and a glycol.

As the dicarboxylic acid, a dicarboxylic acid, an alkyl ester of dicarboxylic acid and an acid halide of dicarboxylic acid are exemplified.

Examples of the dicarboxylic acid include aliphatic carboxylic acids such as oxalic acid, malonic acid, succinic acid, glutaric acid, adipic acid, maleic acid, fumaric acid, suberic acid, azelaic acid, sebacic acid, etc.; and aromatic carboxylic acids such as terephthalic acid, isophthalic acid, 2,6-naphthalenedicarboxylic acid, 2,7-naphthalenedicarboxylic acid, tetrachlorophthalic acid, tetrabromophthalic acid, etc.

Examples of the alkyl ester of the dicarboxylic acid include methyl esters, ethyl esters, n-propyl esters, isopropyl esters, n-butyl esters and n-pentyl esters of the above-described dicarboxylic acids.

As the acid halide of dicarboxylic acid, chlorides, bromides and iodides of the above-described dicarboxylic acids are exemplified.

Examples of the glycols include aliphatic glycols such as ethylene glycol, 1,3-propanediol, 1,3-butanediol, 1,4-butanediol, 1,6-hexanediol, diethylene glycol, dipropylene glycol, neopentyl glycol, triethylene glycol, hydrogenated bisphenol A, 1,12-dodecanediol, cyclohexanedimethanol, etc.; and aromatic glycols such as p-xylene glycol, pyrocatechol, resorcinol, hydroquinone, 4,4'-dihydroxybiphenyl, tert-butylhydroquinone, 2,6-dihydroxynaphthalene, 2,7-dihydroxynaphthalene, bisphenol dihydroxypropyl ether, etc.

Examples of the polyester include polyethylene terephthalate (PET), polybutylene terephthalate (PBT), poly-1,4-cyclohexanedimethylene terephthalate (PCT), polyethylene naphthalate (PEN), polybutylene naphthalate (PBN), etc. The polyester may be an elastomeric polyester comprising soft segments and hard segments. Further, the polyester may contain a filler such as glass fiber, or other additives.

In the present invention, also a liquid crystalline polyester (LCP) may be used as the polyester. Examples of the LCP include a polyester prepared by condensation polymerization of an aromatic hydroxycarboxylic acid (e.g., p-hydroxybenzoic acid or 6-hydroxy-2-naphthoic acid); an aromatic dicarboxylic acid, an alkyl ester of an aromatic dicarboxylic acid, an acid halide of an aromatic dicarboxylic acid or an acid anhydride of an aromatic dicarboxylic acid, and an aromatic or aliphatic glycol.

In the present invention, also an unsaturated polyester may be used. The unsaturated polyester may be a polyester prepared by condensation polymerization of an unsaturated dicarboxylic acid, a dicarboxylic acid and a glycol. The unsaturated dicarboxylic acid may be a free unsaturated dicarboxylic acid, an alkyl ester of an unsaturated dicarboxylic acid, an acid halide of an unsaturated dicarboxylic acid or an acid anhydride of an unsaturated dicarboxylic acid. Examples of the unsaturated dicarboxylic acid include maleic acid, fumaric acid, itaconic acid, etc. Examples of the alkyl ester of an unsaturated dicarboxylic acid include methyl ester, ethyl ester, n-propyl ester, isopropyl ester, n-butyl ester and n-pentyl ester of the above-described dicarboxylic acids. Examples of the acid halide of an unsaturated dicarboxylic acid include chlorides, bromides and iodides of the above-described dicarboxylic acids.

The unsaturated polyester may be used in the form of a solution in a vinyl monomer. Examples of the vinyl monomer include styrene, vinyltoluene, chlorostyrene, diallyl phthalate, triallyl cyanurate, methyl methacrylate, etc.

In the present invention, biodegradable polyester may be used. Examples of the biodegradable polyester include poly (3-hydroxybutylate), poly(3-hydroxybutylic acid), a copolymer of 3-hydroxybutylic acid with 3-hydroxyvaleric acid, polylactic acid, polybutylene succinate, a polybutylene(succinate-adipate) copolymer, a polybutylene(succinate-carbonate) copolymer, polyethylene succinate, a polybutylene(succinate-terephthalate)copolymer, etc.

In the present invention, also a polyester prepared by ring-opening polymerization of a lactone may be used. Examples of the lactone include pivalolactone, ε-caprolactone, etc. Polypivalolactone or poly(ε-caprolactone) may be prepared by ring-opening polymerization of such a lactone.

Among the above-exemplified polyesters, PET, PBT, PEN, PBN, PCT, LCP, polylactic acid, etc. are preferably used in the present invention.

Next, the phosphite of the formula (I) as the component (B) (hereinafter simply referred to as a "phosphite") is described. In the phosphite of the formula (I), $R^1$, $R^2$, $R^4$ and $R^5$ represent independently of one another a hydrogen atom, an alkyl group having 1 to 8 carbon atoms, a cycloalkyl group having 5 to 8 carbon atoms, an alkylcycloalkyl group having 6 to 12 carbon atoms, an aralky group having 7 to 12 carbon atoms or a phenyl group. Herein, examples of the alkyl group having 1 to 8 carbon atoms include a methyl group, an ethyl group, a n-propyl group, an isopropyl group, a n-butyl group, an isobutyl group, a sec-butyl group, a tert-butyl group, a tert-pentyl group, an isooctyl group, a tert-octyl group, a 2-ethylhexyl group, etc.

Examples of the cycloalkyl group having 5 to 8 carbon atoms include a cyclopentyl group, a cyclohexyl group, a cycloheptyl group, a cyclooctyl group, etc. Examples of the alkylcycloalkyl group having 6 to 12 carbon atoms include a 1-methylcyclopentyl group, a 1-methylcyclohexyl group, a 1-methyl-4-isopropylcyclohexyl group, etc. Examples of the aralkyl group having 7 to 12 carbon atoms include a benzyl group, an α-methylbenzyl group, an α,α-dimethylbenzyl group, etc.

$R^1$, $R^2$ or $R^4$ preferably represents an alkyl group having 1 to 8 carbon atoms, a cycloalkyl group having 5 to 8 carbon atoms, or an alkylcycloalkyl group having 6 to 12 carbon atoms. $R^1$ or $R^4$ more preferably represents a tertiary alkyl group such as a tert-butyl group, a tert-pentyl group or a tert-octyl group, a cyclohexyl group or a 1-methylcyclohexyl group. $R^2$ is preferably an alkyl group having 1 to 5 carbon atoms such as a methyl group, an ethyl group, a n-propyl group, an isopropyl group, a n-butyl group, an isobutyl group, a sec-butyl group, a tert-butyl group or a tert-pentyl group, among which a methyl group, a tert-butyl group or a tert-pentyl group is more preferable. $R^5$ is preferably a hydrogen atom or an alkyl group having 1 to 5 carbon atoms such as a methyl group, an ethyl group, a n-propyl group, an isopropyl group, a n-butyl group, an isobutyl group, a sec-butyl group, a tert-butyl group or a tert-pentyl group.

The R³ represent independently of one another a hydrogen atom or an alkyl group having 1 to 8 carbon atoms. Examples of this alkyl group having 1 to 8 carbon atoms may be the same alkyl group having 1 to 8 carbon atoms as exemplified for R¹, R², R⁴ and R⁵. R⁵ is preferably a hydrogen atom or the same alkyl group having 1 to 5 carbon atoms as exemplified for R², and more preferably a hydrogen atom or a methyl group.

X represents a single bond, a sulfur atom or a divalent group of the formula (I-1). In the divalent group of the formula (I-1), R⁶ is a hydrogen atom, an alkyl group having 1 to 8 carbon atoms or a cycloalkyl group having 5 to 8 carbon atoms. Herein, the alkyl group having 1 to 8 carbon atoms and the cycloalkyl group having 5 to 8 carbon atoms may be the same alkyl group and the same cycloalkyl group as those given for R¹, R², R⁴ and R⁵. R⁶ is preferably a hydrogen atom or an alkyl group having 1 to 5 carbon atoms such as a methyl group, an ethyl group, a n-propyl group, an isopropyl group, a n-butyl group or an isobutyl group. X is preferably a single bond or a divalent group of the formula (I-1), more preferably a single bond.

A represents an alkylene group having 2 to 8 carbon atoms or a divalent group of the formula (I-2), and preferably an alkylene group having 2 to 8 carbon atoms. Examples of such an alkylene group include an ethylene group, a propylene group, a butylene group, a pentamethylene group, a hexamethylene group, an octamethylene group and a 2,2-dimethyl-1,3-propylene group. Among them, a propylene group is more preferable. The divalent group of the formula (I-2) is bonded to the oxygen atom and the benzene ring, and the symbol "*" indicates bonding to the oxygen atom. R⁷ represents a single bond or an alkylene group having 1 to 8 carbon atoms. Examples of this alkylene group include a methylene group, an ethylene group, a propylene group, a butylene group, a pentamethylene group, a hexamethylene group, an octamethylene group, a 2,2-dimethyl-1,3-propylene group, etc. R⁷ is preferably a single bond or an ethylene group.

Either one of Y and Z represents a hydroxyl group, an alkyl group having 1 to 8 carbon atoms, an alkoxyl group having 1 to 8 carbon atoms or an aralkyloxy group having 7 to 12 carbon atoms, while the other of Y and Z represents a hydrogen atom or an alkyl group having 1 to 8 carbon atoms. Here, the alkyl group having 1 to 8 carbon atoms may be the same alkyl group as exemplified above for R¹, R², R⁴ and R⁵. Examples of the alkoxyl group having 1 to 8 carbon atoms include a methoxy group, an ethoxy group, a n-propoxy group, an isopropoxy group, a n-butoxy group, an isobutoxy group, a sec-butoxy group, a tert-butoxy group, a tert-pentoxy group, an isooctoxy group, a tert-octoxy group, a 2-ethylhextoxy group, etc. Examples of the aralkyloxy group having 7 to 12 carbon atoms include a benzyloxy group, an α-methylbenzyloxy group, an α,α-dimethylbenzyloxy group, etc. As for Y and Z, Y may be a hydroxyl group, an alkyl group having 1 to 8 carbon atoms, an alkoxyl group having 1 to 8 carbon atoms or an aralkyl group having 7 to 12 carbon atoms, while Z may be a hydrogen atom or an alkyl group having 1 to 8 carbon atoms. Alternatively, Z may be a hydroxyl group, an alkyl group having 1 to 8 carbon atoms, an alkoxyl group having 1 to 8 carbon atoms or an aralkyl group having 7 to 12 carbon atoms, while Y may be a hydrogen atom or an alkyl group having 1 to 8 carbon atoms.

Among the phosphites of the formula (I), particularly preferable is a phosphite of the formula (I) in which each of R¹ and R⁴ is a tertiary alkyl group, a cyclohexyl group or a 1-methylcyclohexyl group; R² is an alkyl group having 1 to 5 carbon atoms; R⁵ is a hydrogen atom or an alkyl group having 1 to 5 carbon atoms; R³ is a hydrogen atom or an alkyl group having 1 to 5 carbon atoms; X is a single bond; and A is an alkylene group having 2 to 8 carbon atoms.

Examples of the phosphite (I) include 2,4,8,10-tetra-tert-butyl-6-[3-(3-methyl-4-hydroxy-5-tert-butylphenyl)propoxy]dibenzo[d,f][1,3,2]dioxaphosphepine (Smilizer® GP available from Sumitomo Chemical Co., Ltd.), 2,10-dimethyl-4,8-di-tert-butyl-6-[3-(3,5-di-tert-butyl-4-hydroxyphenyl)propoxy]-12H-dibenzo[d,g][1,3,2]-dioxaphosphocine, 2,4,8,10-tetra-tert-butyl-6-[3-(3,5-di-tert-butyl-4-hydroxyphenyl)propoxy]dibenzo[d,f][1,3,2]-dioxaphosphepine, 2,4,8,10-tetra-tert-pentyl-6-[3-(3,5-di-tert-butyl-4-hydroxyphenyl)propoxy]-12-methyl-12H-dibenzo[d,g][1,3,2]dioxaphosphocine, 2,10-dimethyl-4,8-di-tert-butyl-6-[3-(3,5-di-tert-butyl-4-hydroxyphenyl)-propionyloxy]-12H-dibenzo[d,g][1,3,2]dioxaphosphocine, 2,4,8,10-tetra-tert-pentyl-6-[3-(3,5-di-tert-butyl-4-hydroxyphenyl)propionyloxy]-12-methyl-12H-dibenzo[d,g][1,3,2]dioxaphosphocine, 2,4,8,10-tetra-tert-butyl-6-[3-(3,5-di-tert-butyl-4-hydroxyphenyl)-propionyloxy]dibenzo[d,f][1,3,2]dioxaphosphepine, 2,10-dimethyl-4,8-di-tert-butyl-6-(3,5-di-tert-butyl-4-hydroxybenzoyloxy)-12H-dibenzo[d,g][1,3,2]dioxaphosphocine, 2,4,8,10-tetra-tert-butyl-6-(3,5-di-tert-butyl-4-hydroxybenzoyloxy)-12-methyl-12H-dibenzo[d,g][1,3,2]-dioxaphosphocine, 2,10-dimethyl-4,8-di-tert-butyl-6-[3-(3-methyl-4-hydroxy-5-tert-butylphenyl)propoxy]-12H-dibenzo[d,g][1,3,2]dioxaphosphocine, 2,4,8,10-tetra-tert-butyl-6-[3-(3,5-di-tert-butyl-4-hydroxyphenyl)propoxy]-12H-dibenzo[d,g][1,3,2]dioxaphosphocine, 2,10-diethyl-4,8-di-tert-butyl-6-[3-(3,5-di-tert-butyl-4-hydroxyphenyl)-propoxy]-12H-dibenzo[d,g][1,3,2]dioxaphosphocine, 2,4,8,10-tetra-tert-butyl-6-[2,2-dimethyl-3-(3-tert-butyl-4-hydroxy-5-methylphenyl)propoxy]-dibenzo[d,f][1,3,2]dioxaphosphepine, etc.

Such a phosphite may be produced, for example, by the method described in JP-A-10-273494.

The content of the phosphite in the polyester composition of the present invention is usually 0.005 part by weight or more, preferably 0.01 part by weight or more, particularly 0.02 part by weight or more, per 100 parts by weight of the polyester. When this content is 0.005 part by weight or more, advantageously, the coloring of the polyester composition after the storage thereof at a high temperature tends to diminish. In view of cost-effectiveness, the content of the phosphite is usually 3 parts by weight or less, preferably 1 part by weight or less, particularly 0.5 part by weight or less.

Next, the compound of the formula (II) (hereinafter optionally referred to as the compound (II)) as one member of the component (C) will be described.

X' in the compound (II) represent a n-hydric alcohol moiety having 1 to 18 carbon atoms which may have a hetero atom and/or a cyclic therein.

The alcohol moiety is a group (RO—) prepared by removing a hydrogen atom from the hydroxyl group of an alcohol (ROH).

X' in the compound (II) is preferably a moiety of triethylene glycol, a moiety of pentaerythritol or a moiety of 3,9-bis(1,1-dimethyl-2-hydroxyethyl)-2,4,8,10-tetraoxaspiro[5.5]undecane; and X' is particularly a moiety of pentaerythritol or a moiety of 3,9-bis(1,1-dimethyl-2-hydroxyethyl)-2,4,8,10-tetraoxaspiro[5.5]undecane.

R⁸ in the compound (II) is an alkyl group having 1 to 8 carbon atoms, and preferable examples of the alkyl group having 1 to 8 carbon atoms include a methyl group, an ethyl group, a tert-butyl group, a tert-pentyl group, a tert-octyl group and a cyclohexyl group. "n" in the compound (II) is an integer of 1 to 4, preferably 2 or 4.

Examples of the compound (II) include 3,9-bis[2-{3-(3-tert-butyl-4-hydroxy-5-methylphenyl)propionyloxy}-1,1-dimethylethyl]-2,4,8,10-tetraoxaspiro[5.5]undecane, bis{3-(3-tert-butyl-4-hydroxy-5-methylphenyl)propionic acid}triethylene glycol ester, tetrakis{3-(3,5-di-tert-butyl-4-hydroxyphenyl) -propionic acid}pentaerythrityl ester, etc.

The amount of the compound (II) to be added is usually from 0.005 to 2 parts by weight, preferably from 0.01 to 1 part by weight, more preferably from 0.02 to 0.5 part by weight, per 100 parts by weight of the polyester. When this amount is 0.005 part by weight or more, advantageously, the polyester composition is stable against thermal deterioration, and the hydrolysis of the phosphate can be prevented.

The neutralizing agent as another member of the component (C) is a compound capable of neutralizing carboxylic acid. Specific examples thereof include metal soaps, aliphatic amides, hydrotalcites, oxides or hydoxides of alkali earth metals, polycarbodiimide, etc. Among them, metal soaps, hydrotalcites and polycarbodiimide are preferable. These materials may be used singly or as a mixture of two or more of them.

A metal soap is a salt of a mono-, di- or trivalent metal with a fatty acid which may optionally have a hydroxyl group as a substituent. The number of carbon atoms in the fatty acid is from 4 to 18, preferably from 10 to 18. Examples of such a fatty acid include stearic acid, palmitic acid, lauric acid, behenic acid, 12-hydroxystearic acid, etc. Examples of the metal include alkali metals, alkaline earth metals, aluminum group metals, iron group metals, zinc, etc. Examples of the alkali metals include lithium, potassium, sodium, etc. Examples of the alkaline earth metals include magnesium, calcium, barium, etc. Preferable examples of the metal soap include calcium stearate and calcium palmitate. Among them, a commercially available calcium stearate (usually, a mixture of calcium stearate and calcium palmitate) is more preferable.

As the fatty acid amides, amides of higher fatty acids are preferable, and amides of saturated or unsaturated higher fatty acids having 12 to 24 carbon atoms are more preferable. Examples of such higher fatty acid amides include monoamides such as lauric amide, myristic amide, palmitic amide, stearic amide, arachidic amide, behenic amide, erucic amide, etc.; and bisamides such as methylenebisbehenic amide, methylenebisstearic amide, methylenebisoleic amide, ethylenebisstearic amide, hexamethylenebisstearic amide, hexamethylenebisoleic amide, etc. Among them, bisamides such as methylenebisstearic amide, ethylenebisstearic amide, etc. are preferable.

The hydrotalcite is a double hydroxide represented by the formula (a):

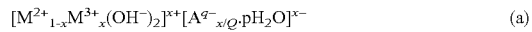

wherein $M^{2+}$ is at least one divalent metal selected from the group consisting of $Mg^{2+}$, $Fe^{2+}$, $Ca^{2+}$, $Zn^{2+}$, $Co^{2+}$ and $Ni^{2+}$; $M^{3+}$ is at least one trivalent metal selected from the group consisting of $Al^{3+}$, $B^{3+}$, $Bi^{3+}$, $Fe^{3+}$ and $Mn^{3+}$; q is a valency of $A^{q-}$; x is a positive number of not larger than 0.33 ($0 < x \leq 0.33$); p is a number of 0 to 2, provided that p may vary depending on dehydration conditions.

Specific examples of the anion $A^{q-}$ having a valency of q include $OH^-$, $Cl^-$, $Br^-$, $I^-$, $ClO_4^-$, $HCO_3^-$, $C_6H_5COO^-$, $CO_3^{2-}$, $SO_4^{2-}$, $^-OOCCOO^-$, $(CHOHCOO)_2^{2-}$, $C_2H_4(COO)_2^{2-}$, $(CH_2COO)_2^{2-}$, $CH_3CHOHCOO^-$, $SiO_3^{2-}$, $SiO_4^{4-}$, $Fe(CN)_6^{4-}$, $BO^{3-}$, $PO_3^{3-}$, $HPO_4^{2-}$, etc.

Examples of the hydrotalcite include natural clay minerals, synthetic hydrotalcites, etc. One of typical hydrotalcites as the natural clay minerals is represented by the formula (a):

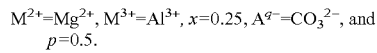

This formula can be expressed based on a simple element ratio by the formula (a-1):

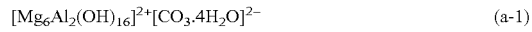

As the hydrotalcite, for example, a synthetic hydrotalcite represented by the formula (a) as follows is preferable: $M^{2+}=Mg^{2+}$, $M^{3+}=Al^{3+}$, x=about 0.3, $A^{q-}=CO_3^{2-}$, and p=about 0.54. This can be expressed based on a simple element ratio, for example, by the formula (a-2):

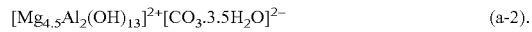

Such a synthetic hydrotalcite is commercially available from Kyowa Chemical Industry, Co., Ltd. under the trade name of "DHT-4A"

The oxides or hydroxides of the alkaline earth metals are the oxides or hydroxides of the Group II metal atoms of the Periodic Table, and examples thereof are calcium oxide, magnesium oxide, calcium hydroxide, magnesium hydroxide, etc., among which calcium hydroxide is preferable.

The polycarbodiimide is a polymer having a —N=C=N— group in the molecule. For example, a polycarbodiimide can be readily produced by a condensation reaction accompanied with the elimination of carbon dioxide from an organic diisocyanate (cf. U.S. Pat. No. 2,941,956; JP-B-47-33279; J. Org. Chem., 28, (1963) 2069-2075; and Chemical Review 1981, Vol. 81, No. 4, 619-621). The polycarbodiimide is commercially available from NISSHINBO INDUSTRIES, INC. under the trade name of CARBOLITE.

The amount of the neutralizing agent to be added is usually from 0.005 to 2 parts by weight, preferably from 0.01 to 1 part by weight, more preferably from 0.02 to 0.5 part by weight, per 100 parts by weight of the polyester. When the amount of the neutralizing agent is 0.005 part by weight or more, the corrosion of an apparatus for use in melt kneading can be prevented. When this amount is 2 parts by weight or less, the hydrolysis resistance of the polyester composition can be improved.

The total content of the compound (II) and the neutralizing agent as the components C is usually from 0.005 to 3 parts by weight, preferably from 0.01 to 1 part by weight, per 100 parts by weight of the polyester.

When the compound (II) is contained as the component C, the weight ratio of the phosphite of the formula (I) to the compound (II) is usually from 1:0.1 to 1:10, preferably from 1:0.2 to 1:5. When the neutralizing agent is contained as the component C, the weight ratio of the phosphite of the formula (I) to the neutralizing agent is usually from 1:0.1 to 1:10, preferably from 1:0.2 to 1:5. As the component (C), one or both of the compound (II) and the neutralizing agent may be used. Preferably, both of the compound (II) and the neutralizing agent are used. When both of them are used, the weight ratio of the phosphite of the formula (I) to the total weight of the components (C) is usually from 1:0.1 to 1:10, preferably from 1:0.2 to 1:5.

The polyester composition of the present invention may be prepared by, for example, mixing the polyester, the phosphite, the compound (II) and/or the neutralizing agent. Specifically, the powder of the polyester, the phosphite, the powder of the compound (II) and/or the neutralizing agent are mixed at a temperature lower than the melting temperature of the polyester. The mixing is carried out using a Henschel mixer or the like. Thus, the polyester composition of the present invention can be obtained as a mixture of the polyester, the phosphite, the compound (II) and/or the neutralizing agent.

The polyester, the phosphite, the compound (II) and/or the neutralizing agent may be kneaded at a temperature not lower than the melting temperature of the polyester. Specifically, the polyester, the phosphite, the compound (II) and/or the neutralizing agent are mixed at a temperature lower than the melting temperature of the polyester, and the mixture is heated to a temperature not lower than the melting temperature of the polyester and is then kneaded. A kneader such as a single screw kneader or a twin screw kneader may be used for this kneading. In this way, the polyester composition comprising a homogeneous dispersion of the phosphite, the compound (II) and/or the neutralizing agent in the melt of the polyester is obtained.

To produce the polyester by condensation polymerization, a dicarboxylic acid and a glycol as raw materials may be condensation-polymerized in the presence of the phosphite, the compound (II) and/or the neutralizing agent. Such a process provides the polyester composition comprising a homogeneous dispersion of the phosphite, the compound (II) and/or the neutralizing agent in the polyester.

The polyester composition comprising a homogeneous dispersion of the phosphite, the compound (II) and/or the neutralizing agent in the polyester can also be prepared by adding the phosphite, the compound (II) and/or the neutralizing agent, when the polyester is produced by condensation polymerization of the carboxylic acid and the glycol or by ring-opening polymerization of a lactone.

Mixing of the polyester, the phosphite, the compound (II) and/or the neutralizing agent in such a way makes it possible to provide the polyester composition of the present invention, which has superior processing stability even after storage under a high temperature atmosphere, and also even after storage under a high temperature and high humidity atmosphere. The polyester composition of the present invention is preferable because the coloring of the polyester composition may be suppressed even after the storage of the polyester composition under a high temperature atmosphere, and also under a high temperature and high humidity atmosphere.

Besides the above-described components (A), (B) and (C), the polyester composition of the present invention may contain conventional additives in such amounts that the effects of the present invention are not impaired. Examples of the additives include phosphites other than the phosphites of the formula (I), phenol-based antioxidants other than the compounds (II), sulfur-based antioxidants, UV absorbents, lubricants such as higher aliphatic amides, plasticizers such as mineral oils and silicone oils, flame retardants, mold release agents such as higher fatty acids, antistatic agents, pigments, dyes, blowing agents, etc. The polyester composition of the present invention may further contain additives such as benzofuranone, indoline, etc. described in U.S. Pat. Nos. 4,325,853, 4,338,244, 5,175,312, 5,216,053 and 5,252,643, DE-A-4316611, German Patent Nos. 4 316 622 and 4 316 876, EP-A-589 839, EP-B-591 102 and CA 2 132 132.

Examples of phenol-based antioxidants include alkylated monophenols such as 2,6-di-tert-butyl-4-mothylphenol, 2,4,6-tri-tert-butylpheniol, 2,6-di-tert-butylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, 2,6-dinonyl-4-methylphenol, 2,4-dimethyl-6-(1'-methylundec-1'-yl)phenol, 2,4-dimethyl-6-(1'-methylheptadec-1'-yl)phenol, 2,4-dimethyl-6-(1'-methyltridec-1'-yl)phenol, and mixtures thereof; alkylthiomethylphenols such as 2,4-dioctylthio-methyl-6-tert-butylphenol, 2,4-dioctylthiomethyl-6-methylphenol, 2,4-dioctylthiomethyl-6-ethylphenol, 2,6-didodecylthiomethyl-4-nonylphenol, and mixtures thereof; hydroquinones and alkylhydroquinones such as 2,6-di-tert-butyl-4-methoxyphenol, 2,5-di-tert-butylhydroquinone, 2,5-di-tert-amylhydroquinone, 2,6-diphenol-4-octadecyloxyphenol, 2,6-di-tert-butylhydroquinone, 2,5-di-tert-butyl-4-hydroxyanisole, 3,5-di-tert-butyl-4-hydroxyphenyl stearate, bis(3,5-di-tert-butyl-4-hydroxyphenyl)adipate, and mixtures thereof;

tocopherols such as α-tocopherol, β-tocopherol, γ-tocopherol, δ-tocopherol, and mixtures thereof; hydroxylthiodiphenyl ether such as 2,2'-thiobis(6-tert-butylphenol), 2,2'-thiobis(4-methyl-6-tert-butylphenol), 2,2'-thiobis(4-octylphenol), 4,4'-thiobis(3-methyl-6-tert-butylphenol), 4,4'-thiobis(2-methyl-6-tert-butylphenol), 4,4'-thiobis(3,6-di-tert-amylphenol), 4,4'-(2,6-dimethyl-4-hydroxyphenyl) disulfide, etc.; alkylidenebisphenol and derivatives thereof such as 2,2'-methylenebis(4-methyl-6-tert-bulyphenol), 2,2'-methylenebis(4-ethyl-6-tert-butylphenol), 2,2'-methylenebis[4-methyl-6-(α-methyl-cyclohexyl)phenol)], 2,2'-methylenebis(4-methyl-6-cyclohexylphenol), 2,2'-methylenebis(4-methyl-6-nonylphenol), 2,2'-methylenebis(4,6-di-tert-butylphenol), 2,2'-ethylenebis(4,6-di-tert-butylphenol), 2,2'-ethylidenebis(4-isobutyl-6-tert-butylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis(6-tert-butyl-2-methylphenol), 4,4'-methylenebis(2,6-di-tert-butylphenol), 4,4'-butylidene-bis(3-methyl-6-tert-butylphenol), 1,1-bis(4-hydroxyphenyl)-cyclohexane, 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methylphenyl)-3-n-dodecylmercaptobutane, ethylene glycol bis[3,3-bis-3'-tert-butyl-4'-hydroxyphenyl)butyrate], bis(3-tert-butyl-4-hydroxy-5-methylphenyl)dicyclopentadiene, bis[2-(3'-tert-butyl-2'-hydroxy-5'-methylbenzyl)-6-tert-butyl-4-methylphenyl] terephthalate, 1,1-bis(3,5-dimethyl-2-hydroxyphenyl) butane, 2,2-bis(3,5-di-tert-butyl-4-hydroxyphenyl)propane, 2,2-bis(5-tert-butyl-4-hydroxy-2-methylphenyl)-4-n-dodecylmercaptobutane, 1,1,5,5-tetra(5-tert-butyl-4-hydroxy-2-methylphenyl)pentane, 2-tert-butyl-6-(3'-tert-butyl-5'-methyl-2'-hydroxybenzyl)-4-methylphenyl acrylate, 2,4-di-tert-pentyl-6-[1-(2-hydroxy-3,5-di -tert-pentylphenyl)ethyl] phenyl acrylate, and mixtures thereof;

O-benzyl derivatives, N-benzyl derivatives and S-benzyl derivatives such as 3,5,3',5'-tetra-tert-butyl-4,4'-dihydroxydibenzyl ether, octadecyl-4-hydroxy-3,5-dimethylbenzyl mercaptoacetate, tris(3,5-di-tert-butyl-4-hydroxybenzyl) amine, bis(4-tert-butyl-3-hydroxy-2,6-dimethylbenzyl) dithioterephthalate, bis(3,5-di-tert-butyl-4-hydroxybenzyl) sulfide, isooctyl-3,5-di-tert-butyl-4-hydroxybenzyl mercaptoacetate, and mixtures thereof; hydroxybenzyl malonate derivatives such as dioctadecyl-2,2-bis(3,5-di-tert-butyl-2-hydroxybenzyl)malonate, dioctadecyl-2-(3-tert-butyl-4-hydroxy-5-methylbenzyl)malonate, didodecylmercaptoethyl-2,2-bis(3,5-di-tert-butyl-4-hydroxybenzyl)malonate, bis[4-(1,1,3,3-tetramethyl-butyl) phenyl]-2,2-bis(3,5-di-tert-butyl-4-hydroxybenzyl)malonate, and mixtures thereof; aromatic hydroxybenzyl derivatives such as 1,3,5-trimethyl-2,4,6-tris(3,5-di-tert-butyl-4-hydroxybenzyl)benzene, 1,4-bis(3,5-di-tert-butyl-4-hydroxybenzyl)-2,3,5,6-tetramethylbenzene, 2,4,6-tris(3,5-tert-butyl-4-hydroxybenzyl)phenol, and mixtures thereof;

triazine derivatives such as 2,4-bis(n-octylthio)-6-(4-hydroxy-3,5-di-tert-butylanilino)-1,3,5-triazine, 2-n-octylthio-4,6-bis(4-hydroxy-3,5-di-tert-butylanilino)-1,3,5-triazine, 2-n-octylthio-4,6-bis(4-hydroxy-3,5-di-tert-butylphenoxy)-1,3,5-triazine, 2,4,6-tris(3,5-di-tert-butyl-4-phenoxy)-1,3,5-triazine, tris(4-tert-butyl-3-hydroxy-2,6-dimethylbenzyl)isocyanurate, tris(3,5-di-tert-butyl-4-hydroxybenzyl) isocyanurate, 2,4,6-tris(3,5-di-tert-butyl-4-hydroxyphenylethyl)-1,3,5-triazine, 2,4,6-tris(3,5-di-tert-butyl-4-hydroxyphenylpropyl)-1,3,5-triazine, tris(3,5-dicyclohexyl-4-hydroxybenzyl)isocyanurate, tris[2-(3',5'-di-tert-butyl-4'-hydroxy-cinnamoyloxy)ethyl]isocyanurate, and mixtures thereof; benzyl phosphonate derivatives such as dimethyl-3,5-di-tert-butyl-4-hydroxybenzyl phosphonate, diethyl-3,5-di-tert-butyl-4-hydroxybenzyl phosphonate, dioctadecyl-3,5-di-tert-butyl-4-hydroxybenzyl phosphonate, dioctadecyl-5-tert-butyl-4-hydroxy-3-methylbenzyl phosphonate, calcium salt of 3,5-di-tert-butyl-4-hydroxybenzyl phosphoric acid mono ester, and mixtures thereof; acylaminophenol derivatives such as 4-hydroxylauranilide, 4-hydroxystearanilide, octyl-N-(3,5-di-tert-butyl-4-hydroxyphenyl)carbamate, and mixtures thereof;

esters of β-(3,5-di-tert-butyl-4-hydroxyphenyl)-propionic acid with monohydric or polyhydric alcohols such as methanol, ethanol, octanol, octadecanol, ethylene glycol, 1,3-propanediol, 1,4-butanediol, 1,6-hexanediol, 1,9-nonanediol, neopentyl glycol, diethylene glycol, thioethylene glycol, spiroglycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane, and mixtures thereof; esters of β-(5-tert-butyl-4-hydroxy-3-methylphenyl)propionic acid with monohydric or polyhydric alcohols such as methanol, ethanol, octanol, octadecanol, ethylene glycol, 1,3-propanediol, 1,4-butanediol, 1,6-hexanediol, 1,9-nonanediol, neopentyl glycol, diethylene glycol, thioethylene glycol, spiroglycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2,2,2]octane, and mixtures thereof; esters of β-(3,5-dicyclohexyl-4-hydroxyphenyl)propionic acid with monohydric or polyhydric alcohols such as methanol, ethanol, octanol, octadecanol, ethylene glycol, 1,3-propanediol, 1,4-butanediol, 1,6-hexanediol, 1,9-nonanediol, neopentyl glycol, diethylene glycol, thioethylene glycol, spiroglycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2,2,2]octane, and mixtures thereof;

esters of 3,5-di-tert-butyl-4-hydroxyphenylacetic acid with monohydric or polyhydric alcohols such as methanol, ethanol, octanol, octadecanol, ethylene glycol, 1,3-propanediol, 1,4-butanediol, 1,6-hexanediol, 1,9-nonanediol, neopentyl glycol, diethylene glycol, thioethylene glycol, spiroglycol, triethylene glycol, pentaerythritol, tris(hydroxyethyl)isocyanurate, N,N'-bis(hydroxyethyl)-oxamide, 3-thiaundecanol, 3-thiapentadecanol, trimethylhexanediol, trimethylolpropane, 4-hydroxymethyl-1-phospha-2,6,7-trioxabicyclo[2,2,2]octane, and mixtures thereof;

amides of β-(3,5-di-tert-butyl-4-hydroxyphenyl)-propionic acid such as N,N'-bis[3-(3',5'-di-tert-butyl-4'-hydroxyphenyl)propionyl]hydrazine, N,N'-bis[3-(3',5'-di-tert-butyl-4'-hydroxyphenyl)propionyl]hexamethylenediamine, N,N'-bis[3-(3',5'-di-tert-butyl-4'-hydroxyphenyl)-propionyl] trimethylenediamine, and mixtures thereof; and the like.

The phenol-based antioxidants exemplified above may be used singly or as a mixture of two or more of them.

Examples of sulfur-based antioxidants include dilauryl 3,3'-thiodipropionate, tridecyl 3,3'-thiodipropionate, dimyristyl 3,3'-thiodipropionate, distearyl 3,3'-thiodipropionate, lauryl stearyl 3,3'-thiodipropionate, neopentantetrayl tetrakis (3-laurylthiopropionate), etc. These sulfur-based antioxidants may be used singly or as a mixture of two or more of them.

Examples of phosphorus-based antioxidantes include triphenylphosphite, tris(nonylphenyl)phosphite, tris(2,4-di-tert-butylphenyl)phosphite, trilaurylphosphite, trioctadecylphosphite, distearyl pentaerythritol diphosphite, diisodecyl pentaerythritol diphosphite, bis(2,4-di-tert-butylpheny) pentaerythritol diphosphite, bis(2,4-di-tert-butyl-6-methylphenyl)pentaerythritol diphosphite, bis(2,6-di-tert-butyl-4-methylphenyl)-pentaerythritol diphosphite, bis(2,4,6-tri-tert-butylphenyl)pentaerythritol diphosphite, tristearylsorbitol triphosphite, tetrakis(2,4-di-tert-butylphenyl)-4,4'-diphenylenediphosphonite, 2,21-methylenebis(4,6-di-tert-butylphenyl)-2-ethylhexyl phosphite, 2,2'-ethylidenebis(4,6-di-tert-butylphenyl)fluorophosphite, bis(2,4-di-tert-butyl-6-methylphenyl)ethyl phosphite, bis(2,4-di-tert-butyl-6-methylphenyl)methyl phosphite, 2-(2,4,6-tri-tert-butylphenyl)-5-ethyl-5-butyl-1,3,2-oxaphosphorinane, 2,2',2''-nitriro[triethyl-tris(3,3',5,5'-tetra-tert-butyl-1,1'-biphen-2,2'-diyl)phosphite, and mixtures thereof. These phosphorus-based antioxidants may be used singly or as a mixture of two or more of them.

Examples of UV absorbers include salicylate derivatives such as phenyl salicylate, 4-tert-butylphenyl salicylate, 2,4-di-tert-butylphenyl 3',5'-di-tert-butyl-4'-hydroxybenzoate, 4-tert-octylphenyl salicylate, bis(4-tert-butylbenzoyl)resorcinol, benzoylresorcinol, hexadecyl 3',5'-di-tert-butyl-4'-hydroxybenzoate, octadecyl 3',5'-di-tert-butyl-4'-hydroxybenzoate, 2-methyl-4,6-di-tert-butylphenyl 3',5'-di-tert-butyl-4'-hydroxybenzoate, and mixtures thereof;

2-hydroxybenzophenone derivatives such as 2,4-dihydroxybenzophenone, 2-hydroxy-4-methoxybenzophenone, 2-hydroxy-4-octoxybenzophenone, 2,2'-dihydroxy-4-methoxy-benzophenone, bis(5-benzoyl-4-hydroxy-2-methoxyphenyl)-methane, 2,2',4,4'-tetrahydroxybenzophenone, and mixtures thereof;

2-(2'-hydroxyphenyl)benzotriazoles such as 2-(2'-hydroxy-5-methylphenyl)benzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-tert-octylphenyl) benzotriazole, 2-(3-tert-butyl-2-hydroxy-5-methylphenyl)-5-chlorobenzotriazole, 2-(3'-s-butyl-2-'hydroxy-5'-tert-butylphenyl)benzotriazole, 2-(2'-hydroxy-4'-octyloxyphenyl)benzotriazole, 2-(3',5'-di-tert-amyl-2'-hydroxyphenyl)benzotriazole, 2-[2'-hydroxy-3',5'-bis(α,α-dimethylbenzyl)phenyl]-2H-benzotriazole, 2-[(3'-tert-butyl-2'-hydroxyphenyl)-5'-(2-octyloxycarbonylethyl)phenyl]-5-chlorobenzotriazole, 2-[3'-tert-butyl-5'-[2-(2-ethylhexyloxy) carbonylethyl]-2'-hydroxyphenyl]-5-chlorobenzotriazole, 2-[3'-tert-butyl-2'-hydroxy-5'-(2-methoxycarbonylethyl) phenyl]-5-chlorobenzotriazole, 2-[3'-tert-butyl-2'-hydroxy-5'-(2-methoxycarbonylethyl)-phenyl]benzotriazole, 2-{3'-tert-butyl-2'-hydroxy-5-(2-octyloxycarbonylethyl)phenyl] benzotriazole, 2-(3'-tert-butyl-2'-hydroxy-5'-[2-(2-ethylhexyloxy)carbonylethyl]-phenyl}benzotriazole, 2-[2-hydroxy-3-(3,4,5,6-tetrahydrophthaiimidomethyl)-5-methylphenyl]benzotriazole, 2-(3,5-di-tert-butyl-2-hydroxyphenyl)-5-chlorobenzotriazole, a mixture of 2-(3'- dodecyl-2'-hydroxy-5'-methylphenyl) -benzotriazole and 2-[3'-tert-butyl-2'-hydroxy-5'-(2-isooctyloxycarbonylethyl) phenyl]benzotriazole, 2,2'-methylenebis[6-(2H-benzotriazol-2-yl)-4-(1,1,3,3-tetramethylbutyl)phenol, 2,2'-methylenebis[4-tert-butyl-6-(2H-benzotriazol-2-yl)phenol], a condensate of poly(3-11)(ethylene glycol)and 2-[3'-tert-butyl-2'-hydroxy-5'-(2-methoxycarbonylethyl)phenyl]benzotriazole, a condensate of poly(3-11)(ethylene glycol)and methyl 3-[3-(2H-benzotriazol-2-yl)-5-tert-butyl-4-hydroxyphenyl]propionate, 2-ethylhexyl 3-[3-tert-butyl-5-(5-chloro-2H-benzotriazol-2-yl)-4-hydroxyphenyl]propionate, octyl 3-[3-tert-butyl-5-(5-chloro-2H-benzotriazol-2-yl)-4-hydroxyphenyl]propionate, methyl 3-[3-tert-butyl-5-(5-chloro-2H-benzotriazol-2-yl)-4-hydroxyphenyl]propionate, 3-[3-tert-butyl-5-(5-chloro-2H-benzotriazol-2-yl)-4-hydroxyphenyl]propionic acid, and mixtures thereof. These UV absorbers may be used singly or as a mixture of two or more of them.

Among the above-exemplified additives, phenol-based antioxidants, phosphorous-based antioxidants, sulfur-based antioxidants, UV absorbents, etc. are preferably used. The additives may be previously mixed with the polyester or with the phosphate, the compound (II) and the neutralizing agent. Alternatively, the additives may be added simultaneously with the mixing of the polyester, the phosphite, the compound (II) and/or the neutralizing agent.

The polyester composition of the present invention may contain a thermoplastic resin other than the polyester. Examples of other thermoplastic resin include polyolefin resins such as polyethylene and polypropylene, polycarbonate resins, polyphenylene ether resins, polyamide resins, acrylonitrile-butadiene-styrene resins (ABS resins), etc.

The polyester composition of the present invention is heated and molten as in the case of conventional polyesters, and is molded in a molten state to provide a polyester molded article. Since the polyester composition of the present invention has sufficient resistance to hydrolysis, it shows small change in MFR in molding even after storage in a stockroom for a long period of time, and thus can be easily molded to provide a polyester molded article.

When the polyester composition of the present invention is a mixture of the pellets of the polyester, the phosphate, the compound (II) and/or the neutralizing agent or a homogeneous dispersion of the phosphite, the compound (II) and/or the neutralizing agent in the polyester, such a polyester composition may be heated and molded in a molten state When the polyester composition of the present invention is prepared by kneading the polyester, the phosphite, the compound (II) and/or the neutralizing agent at a temperature not lower than the melting temperature of the polyester, the resultant polyester composition in a molten state may be directly supplied without cooling to a molding apparatus. The molding method is not limited, and any of the conventional molding methods such as injection molding, extrusion molding, extrusion blow molding, injection blow molding and biaxial stretching blow molding may be employed.

The resultant molded article is cooled after the molding. Thus, the polyester molded article comprising the polyester composition of the present invention is obtained. Examples of the polyester molded article include electric or electronic components such as a coil bobbin, a connector, a switch, a resister part, a socket, a relay, a condenser casing, a fuse, a motor, an oven range, a printed board, an IC manufacturing device and a lamp; automobile parts such as an air outlet garnish, a ventilation hood, a distributor cap and an exhaust gas control valve; machine parts such as a gear and a cam; clock parts such as a bottom board; camera parts such as a bottom cover, a lens-barrel and a lever; parts of leisure goods such as a reel; housings for household electric appliances; wiring accessories for illuminators; films; bottles; textiles; septic tanks; closet tanks; bath tubs; prefabricated baths; water tanks; ships; chemical tanks; pipes; corrugated plates; slabs; paints; decorative panels; filler materials for electric parts; and resin concretes.

EXAMPLES

Hereinafter, the present invention will be described in more detail by the following Examples, which should not be construed as limiting the scope of the present invention in any way.

Herein, the melt flow rates (MFR) of the polyester and the polyester composition were measured with a melt indexer, at 190° C. under a load of 2,160 g for a residence time of 5 minutes.

Example 1

Polylactic acid (PLA) [TERRAMAC (TE-2000) from UNITIKA Ltd.; MFR: 10 g/10 min.] (100 parts by weight) as a polyester, 2,4,8,10-tetra-t-butyl-6-[3-(3-methyl-4-hydroxy-5-t-butylphenyl)propoxy]dibenzo[d,f][1,3,2]dioxaphosphepine (hereinafter referred to as an "ester compound") (0.15 part by weight) as a phosphite, and 3,9-bis[2-{3-(3-t-butyl-4-hydroxy-5-methylphenyl)propionyloxy}-1, 1-dimethylethyl]-2,4,8,10-tetraoxaspiro[5.5]undecane (hereinafter referred to as a "compound 1") (0.15 part by weight) as a compound of the formula (II) were dry-mixed, and the resulting mixture was melt-kneaded at 250° C. with a single screw extruder with a diameter of 30 mm and then pelletized. The resulting pellets were cooled to obtain the pellets of the polyester composition.

Then, the pellets of the polyester composition were stored for 7 days under an atmosphere of 40° C. and 80% RH. After the completion of the storage, the MFR of the pellets was measured to find that it was 22.7 g/10 min. No coloring of the pellets of the polyester composition was observed after storage under the above-described high temperature and high humidity atmosphere.

Example 2

The same procedure as in Example 1 was repeated, except that tetrakis{3-(3,5-di-t-butyl-4-hydroxyphenyl)-propionic acid}pentaerithrityl ester (hereinafter referred to as a "compound 2") was used instead of the compound 1. The MFR of the pellets of the polyester composition measured after storage under a high temperature and high humidity atmosphere was 22.9 g/10 min. No coloring of the pellets of the polyester composition was observed after storage under the above-described high temperature and high humidity atmosphere.

Comparative Example 1

The pellets of a polyester composition were prepared by repeating the same procedure as in Example 1, except that the compound 1 was not used, and that the amount of the phosphite was changed to 0.3 part by weight per 100 parts by weight of PLA. The pellets of the polyester composition were stored under the high temperature and high humidity atmosphere as described in Example 1. Then, the MFR of the pellets was measured to find that it was 24.1 g/10 min.

Comparative Example 2

The pellets of a polyester composition were prepared by repeating the same procedure as in Example 2, except that no phosphite was used, and that the amount of the compound 2 was changed to 0.3 part by weight per 100 parts by weight of PLA. The pellets of the polyester composition were stored under the high temperature and high humidity atmosphere as described in Example 1. Then, the MFR of the pellets was measured to find that it was 24.9 g/10 min.

Example 3

The pellets of a polyester composition were prepared by repeating the same procedure as in Example 1, except that 0.1 part by weight of a neutralizing agent (hydrotalcite, DHT-4A from Kyowa Chemical Industry Co., Ltd.) was additionally added per 100 parts by weight of PLA. The pellets of the polyester composition were stored under the high temperature and high humidity atmosphere as described in Example 1. Then, the MFR of the pellets was measured to find that it was 20.8 g/10 min. No coloring of the pellets of the polyester composition was observed after storage under the above-described high temperature and high humidity atmosphere.

Example 4

The pellets of a polyester composition were prepared by repeating the same procedure as in Example 3, except that the compound 1 was not used, and that the amount of the phosphite was changed to 0.3 part by weight per 100 parts by weight of PLA. The pellets of the polyester composition were stored under the above-described high temperature and high humidity atmosphere. Then, the MFR of the pellets was measured to find that it was 22.2 g/10 min. No coloring of the pellets of the polyester composition was observed after storage under the above-described high temperature and high humidity atmosphere.

Comparative Example 3

The pellets of a polyester composition were prepared by repeating the same procedure as in Example 3, except that no phosphite was used, and that the amount of the compound 1 was changed to 0.3 part by weight per 100 parts by weight of PLA. The pellets of the polyester composition were stored under the above-described high temperature and high humidity atmosphere. Then, the MFR of the pellets was measured to find that it was 24.3 g/10 min.

TABLE 1

|  | Polyester (pbw) | Phosphite (pbw) | Compound (II) (pbw) | Neutralizing agent (pbw) | MFR after storage (g/10 min.) |
|---|---|---|---|---|---|
| Ex. 1 | 100 | 0.15 | Compound 1 0.15 | — | 22.7 |
| Ex. 2 | 100 | 0.15 | Compound 2 0.15 | — | 22.9 |
| Ex. 3 | 100 | 0.15 | Compound 1 0.15 | 0.1 | 20.8 |
| Ex. 4 | 100 | 0.30 | — | 0.1 | 22.2 |
| Comp. Ex. 1 | 100 | 0.30 | — | — | 24.1 |
| Comp. Ex. 2 | 100 | — | Compound 2 0.30 | — | 24.9 |
| Comp. Ex. 3 | 100 | — | Compound 1 0.30 | 0.1 | 24.3 |

Examples 5-8

Polylactic acid (PLA) [TERRAMAC (TE-2000 N) from UNITIKA Ltd.; MFR: 10 g/10 min.] as a polyester, the ester compound as a phosphate, the compound 1 as a compound of the formula (II) and hydrotalcite as the neutralizing agent were dry-mixed in the amounts indicated in Table 2, and the resulting mixture was melt-kneaded at 250° C. with a single screw extruder with a diameter of 30 mm and then pelletized. The resulting pellets were cooled to obtain the pellets of the polyester composition.

Then, the pellets of the polyester composition were stored for 7 days under an atmosphere of 40° C. and 80% RH. After the completion of the storage, the MFR of the pellets was measured. The results are shown in Table 2. No coloring of the pellets of the polyester composition was observed after storage under the above-described high temperature and high humidity atmosphere.

Comparative Examples 4 to 6

The same procedures as in Examples 5 to 8 were repeated, except that the amounts of the respective components were changed to amounts indicated in Table 2, and the MFR of the pellets of the respective polyester compositions was measured. The results are also shown in Table 2.

TABLE 2

|  | Polyester (pbw) | Phosphite (pbw) | Compound (II) (pbw) | Neutralizing agent (pbw) | MFR after storage (g/10 min.) |
|---|---|---|---|---|---|
| Ex. 5 | 100 | 0.15 | Compound 1 0.05 | 0.1 | 19.8 |
| Ex. 6 | 100 | 0.15 | Compound 1 0.15 | 0.1 | 19.7 |
| Ex. 7 | 100 | 0.15 | Compound 1 0.50 | 0.1 | 19.7 |
| Ex. 8 | 100 | 0.15 | Compound 1 0.15 | 0.05 | 19.2 |
| Comp. Ex. 4 | 100 | 0.30 | — | — | 22.0 |
| Comp. Ex. 5 | 100 | — | Compound 2 (0.30) | — | 21.6 |
| Comp. Ex. 6 | 100 | — | Compound 1 0.30 | 0.1 | 21.4 |

The polyester compositions of the present invention have superior processing stability even after storage under a high temperature and high humidity atmosphere.

The polyester molded articles produced from the polyester compositions of the present invention can be suitably used, for example, as electric or electronic components such as a coil bobbin, a connector, a switch, a resister part, a socket, a relay, a condenser casing, a fuse, a motor, an oven range, a printed board, an IC manufacturing device and a lamp; automobile parts such as an air outlet garnish, a ventilation hood, a distributor cap and an exhaust gas control valve; machine parts such as a gear and a cam; clock parts such as a bottom board; camera parts such as a bottom cover, a lens-barrel and a lever; parts of leisure goods such as a reel; housings for household electric appliances; wiring accessories for illuminators; films; bottles; textiles; septic tanks; closet tanks; bath tubs; prefabricated baths; water tanks; ships; chemical tanks; pipes; corrugated plates; slabs; paints; decorative panels; filler materials for electric parts; and resin concretes.

The invention claimed is:

1. A polyester composition comprising the following components (A), (B) and (C):
   (A) a polyester,
   (B) a phosphite of the formula (I):

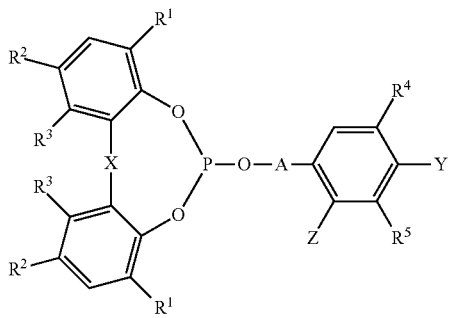

wherein $R^1$, $R^2$, $R^4$ and $R^5$ represent independently of one another a hydrogen atom, an alkyl group having 1 to 8 carbon atoms, a cycloalkyl group having 5 to 8 carbon atoms, an alkylcycloalkyl group having 6 to 12 carbon atoms, an aralkyl group having 7 to 12 carbon atoms or a phenyl group;

$R^3$ represent independently of one another a hydrogen atom or an alkyl group having 1 to 8 carbon atoms;

X represents a single bond, a sulfur atom or a divalent group of the formula (I-1):

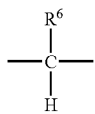

in which $R^6$ represents a hydrogen atom, an alkyl group having 1 to 8 carbon atoms or a cycloalkyl group having 5 to 8 carbon atoms;

A represents an alkylene group having 2 to 8 carbon atoms or a divalent group of the formula (I-2):

in which $R^7$ represents a single bond or an alkylene group having 1 to 8 carbon atoms;
and * means bonding to the side of an oxygen atom; and
either one of Y and Z represents a hydroxyl group, an alkyl group having 1 to 8 carbon atoms, an alkoxyl group having 1 to 8 carbon atoms or an aralkyloxy group having 7 to 12 carbon atoms, while the other of Y and Z represents a hydrogen atom or an alkyl group having 1 to 8 carbon atoms, and (C) at least one component selected from the group consisting of a neutralizing agent and a compound of the formula (II) and:

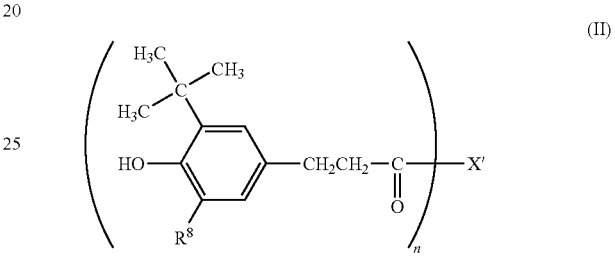

wherein $R^8$ represents an alkyl group having 1 to 8 carbon atoms; n is an integer of 1 to 4;
and X' represents a n-hydric alcohol moiety having 1 to 18 carbon atoms which may have a hetero atom and/or a cyclic structure therein,
wherein the polyester is polylactic acid.

2. The polyester composition of claim 1, wherein the content of the phosphite of the formula (I) is from 0.005 to 3 parts by weight per 100 parts by weight of the polyester.

3. The polyester composition of claim 1, wherein the total content of the compound of the formula (II) and the neutralizing agent is from 0.005 to 3 parts by weight per 100 parts by weight of the polyester.

4. The polyester composition of claim 1, wherein the component (C) contains both of the compound of the formula (II) and the neutralizing agent.

5. The polyester composition of claim 1, wherein the weight ratio of the phosphite of the formula (I) to the compound of the formula (II) is from 1:0.1 to 1:10.

* * * * *